(12) United States Patent
Darmawan

(10) Patent No.: US 6,843,920 B1
(45) Date of Patent: Jan. 18, 2005

(54) ION EXCHANGE SYSTEM USING U-TUBE PRINCIPLE

(76) Inventor: Arianto Darmawan, J1. Hegarmanah 63, Bandung 40141 (ID)

( * ) Notice: Subject to any disclaimer, the term of this patent is extended or adjusted under 35 U.S.C. 154(b) by 0 days.

(21) Appl. No.: 09/582,175

(22) PCT Filed: Jul. 7, 1998

(86) PCT No.: PCT/IB98/01039

§ 371 (c)(1),
(2), (4) Date: Jun. 21, 2000

(87) PCT Pub. No.: WO99/33568

PCT Pub. Date: Jul. 8, 1999

(30) Foreign Application Priority Data

Dec. 23, 1997 (ID) ............................................. P-973953

(51) Int. Cl.⁷ ............................................. B01D 15/04
(52) U.S. Cl. ........................ 210/678; 210/95; 210/275; 210/284; 210/289
(58) Field of Search ................................ 210/678, 741, 210/793, 794, 795, 95, 275, 284, 289

(56) References Cited

U.S. PATENT DOCUMENTS

| | | | |
|---|---|---|---|
| 1,688,915 A | | 10/1928 | Astrom ........................ 210/252 |
| 2,554,163 A | * | 5/1951 | West ............................ 210/274 |
| 2,855,364 A | * | 10/1958 | Roberts ....................... 210/275 |
| 3,774,625 A | * | 11/1973 | Wiltrout .................... 134/104.2 |
| 4,461,706 A | * | 7/1984 | Siegers ....................... 210/275 |
| 4,648,976 A | * | 3/1987 | Chen ........................... 210/275 |
| 4,719,010 A | * | 1/1988 | Seibel ......................... 210/275 |
| 5,972,211 A | * | 10/1999 | Jones .......................... 210/275 |

FOREIGN PATENT DOCUMENTS

| | | |
|---|---|---|
| DE | 16 42 849 | 4/1971 |
| DE | 1 642 849 | 4/1971 |
| GB | 1068403 | 5/1967 |

OTHER PUBLICATIONS

Degremont, "Water Treatment Handbook", 5th Edition, John Wiley & Sons, 1979, pp. 319–320.
The Upcore System, "Upflow Countercurrent Regeneration System". Dow Chemical Company, Form No. 177–01527–895 CH 171–280–E–0896 R.
Amberpack, "Backwashable Packed Bed System", [External Backwashing], Ion Exchange Resins. Rohm and Haas Company: Print INF 9003 A. Dec. 1993, Impacts RCS B–350424636.
V.R. Davies, "Counter Current Ion Exchange Systems in Industrial and Utility Water Treatment", Rohm and Haas Company, Mar. 1989.

* cited by examiner

Primary Examiner—Ivars C. Cintins
(74) Attorney, Agent, or Firm—Christie, Parker & Hale, LLP

(57) ABSTRACT

This invention is a liquid separation system using ion exchange resin, adsorbent resin and catalytic resin based on U-tube principle. It is shown that relatively low fluid velocity is sufficient to maintain the resin bed in compacted state during the operation as well as during the regeneration processes so that high quality product, low regenerant consumption, and convenient operation are obtained.

6 Claims, 12 Drawing Sheets

ION EXCHANGE SYSTEM USING U-TUBE PRINCIPLE

FIELD OF INVENTION

This invention is concerned with processes of liquid separation using ion exchange system and in particular forms is related to method for demineralizing or softening of water, purification of aquaous solution, recovery of metals and valuable compounds.

BACKGROUND OF INVENTION

Ion exchange system is a process of liquid separation. Generally this process uses ion exchange resin, adsorbent resin or catalytic resin.

Ion exchange resins are polymeric beads, granulas or powders having a functional acidic group called cation resin and basic group called anion. They work by exchanging ions in a solution with ions fixed inside the porous polymer matrix of the resin. Adsorbent resins are more porous and work by attracting materials onto the large surfaces of the resin. Catalytic resins are polymer beads or powders with acidic or basic groups and provide an effective, environmentally friendly alternative to liquid catalist.

In most cases involving ion exchange system the resin is confined in a column. The system may contain one or more columns filled with one or more types of resin of the same or different function. The particular advantage of such ion exchange liquid separation systems as described above lies in their effectiveness, high efficiency, simplicity and low operating cost compared to other separation processes such as evaporation, reverse osmosis and the like. Successful liquid separation processes using ion exchange system depend in major part, upon the characteristic of the system utilized. Among the desired characteristics are:

High purity of the processed product.
  The system must be able to ensure production of high quality of demineralized or adsorbed product. It should keep the resin bed in a compacted form and reduce the ion leakage.

Low chemical consumption
  Regeneration of the exhausted resin should be performed efficiently for optimum chemical consumption and should maximize the resin bed operating capacity such as to produce the most highly regenerated resin at the service flow outlet.

Less waste during regeneration
  Regeneration is to be performed efficiently, less time, less water consumption for backwashing and rinsing, and less chemical waste.

Reduced pressure drop
  High flow rate increases pressure drop. High pressure drop increases possibility of breakage of the resin beads and causes higher pumping energy.

Wide range of flow rates
  Since most processes are not constant the system should be operable for processes at wide range of flow rates and is still capable to produce highly purified product.

Low operating and investment cost
  The system should be easily operable with low operating, investment and maintenance costs.

The following basic ion exchange systems are generally available.

The first system is a cocurrent system where the direction of flow during service is from top to bottom while the regeneration process is also from top to bottom (DEGREMONT. WATER TREATMENT HANDBOOK, 5th EDITION, JOHN WILEY & SONS 1979 PAGE 319–320). In this system the resin bed is compacted during service and regeneration. During service the liquid is passed through a column which contains resin beads supported by underdrain which normally contains nozzles at the bottom of the tank. There is a free board above the surface of the resin almost as high as the resin bed to allow the resin bed to be effectively backwashed before the regeneration process to clean and remove the small broken particles.

This cocurrent system is widely used since it is simple but requires plenty of regenerant. Because the regenerant flow is from top to bottom the highly regenerated resin bed is at the service flow inlet while the lower regenerated resin bed is at the service flow outlet. Therefore the purity of the processed products is not very high. This system requires a lot of regenerant and should be backwashed before each regeneration process.

The second system is a counter current system where the direction of flow during service is from top to bottom while the flow of the regeneration process is from bottom to top (THE UPCORE SYSTEM, DOW CHEMICAL COMPANY, FORM No.17701527895 CH 17280 E 0895 R). The upper part of the column is equipped with upper bed containing nozzles identical to that of the underdrain bed. There is a free board above the resin bed to accommodate 5–10% expansion of the resin bed after being exhausted.

The disadvantage of This system is that during the regeneration process, where the regenerant flow is from bottom to top, the resin will not be fully compacted due to the tendency of fluidization which Causes the regeneration process to be less effective. Because of the low upflow speed of the limited quantity of regenerant as well as the tenency of the resin bed to fall down due to the higher specific gravity of the resin as compared to that of the liquid, more regenerant are required during regeneration although it is still less than that of the cocurrent system.

Tank diameter is correlated to the upflow speed of the regenerant. Increasing the upflow speed would result in smaller tank diameter and smaller resin volume and therefore shorter regeneration cycle.

There is no backwashing facility and the resin should be discharged from the column if the pressure drop of the system exceeds the limit due to the accumulation of the broken resin particles on the nozzles opening. This system requires specially sized resin with more uniform particles to reduce pressure drop.

The third system is a counter current system where the direction of flow during service is from bottom to top and the regeneration process is conducted from top to bottom (AMBERPACK BACKWASHABLE PACKED BED SYSTEM [EXTERNAL BACKWASHING] ROHM AND HASS; PRINT INF 9003 A DEC 93 IMPACTES RCS B 350424636). The upper part of the column is equipped with upper bed which contains nozzles identical to that of the underdrain bed. There is a free board above the resin bed to accommodate 5% to 10% expansion of the resin bed after being exhausted.

The disadvantage of this system is that during service, where the flow is from bottom to top, the flow speed must be relatively high in order to obtain a compacted resin bed. In many operations the service flow rate is fluctuating or interupted which causes fluidization or fall of the resin bed. This makes the resin bed uncompacted and contaminates the highly regenerated resin at the flow outlet which will reduce the water quality and exchange capacity.

Small broken resin particles tends to rise to the top and resin fines with the size smaller than the nozzle openings may be transported and contaminate the other ion exchange vessel. To protect the system a resin trap should be installed, but it will increase the pressure drop. There is no internal backwashing facility and the resin should be discharged to be backwashed outside of the column if the pressure drop of the system exceeds the limit due to the accumulation of the broken resin particles having sizes larger than the nozzle openings. This system requires specially sized resin with more uniform particles to reduce pressure drop.

U.S. Pat. No. 1,688,915 (year: 1928) utilizes two connected compartments as apparatus for treating liquids. This invention emphasized that no screen are required for carrying the weight of the softening material because the weight of the softening material is carried directly by the tanks or containers themselves. No compaction of the softening material and counter current effect was intended.

One can understand this phenomenon since at the time this invention was filed, softening material contain mostly of minerals which are much heavier than nowadays resin. This system does not have a separate backwashing port.

The tank diameter is correlated with the upflow speed during service where increasing the speed requires smaller tank diameter and therefore yields smaller resin volume and consequently shorter regeneration cycle.

The fourth system is a counter current system with water or air hold down (COUNTER CURRENT ION EXCHANGE SYSTEMS IN INDUSTRIAL AND UTILITY WATER TREATMENT. V. R. DAVIES. ROHM AND HAAS COMPANY, MARCH 1989). This system is a down flow service and upflow regeneration. In the water hold down system, there is a free board above the resin bed with distributor at the top. Regenerant exit distributor is buried just below the upper surface of the resin bed.

During regeneration cycle, the regenerant will flow upward from the bottom and exit through this collector while at the same time water will flow downward from the distributor through this exit distributor to maintain packed resin bed. In the air hold down system, air is used instead of water for the regeneration process.

The disadvantage of this system is that it requires a relatively large quantity of water or air during regeneration to compact the resin bed. Besides, the operation and maintenance are more complicated.

Counter current system shows advantages over cocurrent system. During regeneration process the resin bed at the regenerant inlet will be highly regenerated with the highest exchange capacity while the resin bed at the regenerant outlet will remain partially in the exhausted stage and has lower exchange capacity. In the cocurrent system where the service inlet is the same as the regenerant inlet, this partially exhausted stage will affect the leakage influencing the quality of the treated liquid. It is possible to increase the quality of the treated liquid by imposing higher regeneration level to convert the partially exhausted stage resin to become more highly regenerated but it will be less economical.

In the counter current system the outlet liquid will be in contact with highly regenerated portion of the resin during the service which yields much higher quality of processed liquid with less leakage and less regenerant cycle.

SUMMARY OF INVENTION

The principal objective of this invention is developing a design of an ion exchange system for producing the highest purity of processed product with the following features: low chemical consumption, easy operation and maintenance, less waste, low operating cost, low investment cost and has a wide range of application.

Another objective of this invention is developing a design of a counter current ion exchange system which can tolerate changes of flow rates during service cycle or even interuption of service flow. Furthermore the system should have the capability of internal backwashing whenever required to remove the resin fines if the pressure drop exceeds the expected limit. The system can be operated at low service flow rate with low pressure drop so that besides specially sized resin, standard sized resin may be used.

The aforementioned principal objective has been achieved by building a system operating on a counter current base where the resin is always compacted during service cycle, regenerated cycle or even when the flow is interupted. The system is also provided with backwashing facility where the backwashing flow rate can be adjusted. The backwashing is in effect only if the pressure drop of the system increases such as to exceed a certain limit. In normal condition backwashing is required only after more than one hundred regeneration cycles, so there is practically no backwashed waste water in the regeneration process except once a year or whenever required.

The design of the system of this invention comprises a vertical column divided into two vertical compartments with free space in the lower part so that both compartments are interconnected and form a U tube type connection. They are filled with one or more types of ion exchange resin. The upper part of each compartment is equipped with upper bed containing nozzles. There is a free board above the resin bed to accommodate the expansion of the resin bed occurring after being exhausted or during regeneration. The direction of flow during service cycle is from top to bottom in one compartment and upward in the other compartment. The direction of flow during regeneration process, which is conducted from the other compartment, is also from top to bottom and then flows upward through the other side.

One configuration is a vertical column usually round in shape with vertical partition inside which divides this column into two vertical compartments with free space at the lower part so that it forms a U tube type connection.

Because of the U tube form, the force required to compact the resin during service cycle as well as during regeneration cycle is very small. Consequently, low velocity is sufficient to compact the resin. The equation is based on the drag force applied by flow against particle.

With reference to FIG. 10, consider the U tube model of the present invention as shown in FIG. 10.

The fluid exerts a drag force $F_d$ on the resin such that the resin column is displaced a distance h on each side of the tube.

Suppose the fluid flows from the right tube downward and upward to the other tube. The surface of the resin in the right tube is displaced down a distance h and in the left tube the surface of the resin is displaced up a distance h, so that the difference between the level of the resin on each tube is 2 h. The work required to move the resin column is $F_d$ h. If the friction force is $f_r$, then the energy balance gives: $(F_d h - f_r h) = \frac{1}{2}\rho_p A g h^2$ where the right hand side is the raise of the potential energy of the resin. Therefore $$(F_d - f_r) = \frac{1}{2}\rho_p A g h \tag{1}$$

But the drag force is equal to $$F_d = C a \rho u^2 / 2 g_c \tag{2}$$

where C is a constant, dan ρ is the density of the fluid.

Combining Eqs.(1) and (2) yields:

$$u=\sqrt{(\rho_p g g_c h/C\rho+f_r, 2g_c/CA\rho)} \quad (3)$$

With reference to FIG. 11, now consider a conventional system with a resin column in a straight tube as shown in FIG. 11. The resin 4 column is displaced a distance h to make it compact. Suppose the length of the resin column is L and its mass is m.

Energy balance equation yields:

$$(F_d-f_r-mgL)h=\tfrac{1}{2}\rho_p Agh^2 \quad (4)$$

Comparison of Eqs.(3) and (5) shows that the required velocity to make the resin compact in the conventional system is higher than that of the present invention.

It has been discovered that the resin bed remains compacted even when the cycle of the system is interrupted, This is because the resistance of the resin bed is higher than the gravitational force that would move the resin from its initial position due to the different surface level of the resin in both columns.

Compacted bed increases the performance of regeneration and service cycle. During regeneration a compacted bed will keep the resin bed firm so that the exchange of ions will be most effective with the highly regenerated zone at the regenerant inlet which is also the service outlet of the service cycle.

The system is self cleaning. During regeneration the fine broken particles which may migrate to the top of the resin bed will be carried away together with the regenerant waste. The fine particles in the other compartment will be carried away during the rinsing process. Due to the self cleaning mechanism, in most cases no backwashing is required.

Nevertheles this system is equipped with internal backwashing system. After several hundreds of operation cycles broken resin particles of sizes larger than nozzle opening may accumulate which will increase the pressure drop above the acceptable limit. Backwashing can be conducted by adjusting the backwash flow rate to fluidize the resin bed and carry the fine particles away with the backwash waste.

Another advantage of this system compared to other cocurrent systems is that this system may use larger tank with larger volume of resin so that longer backwash interval can be obtained because this system is not affected by low service and regeneration flow rates.

BRIEF DESCRIPTION OF FIGURES

The present invention will now be further described in the accompanying drawings, in which.

COMPLETE DESCRIPTION OF INVENTION

Figure 1:
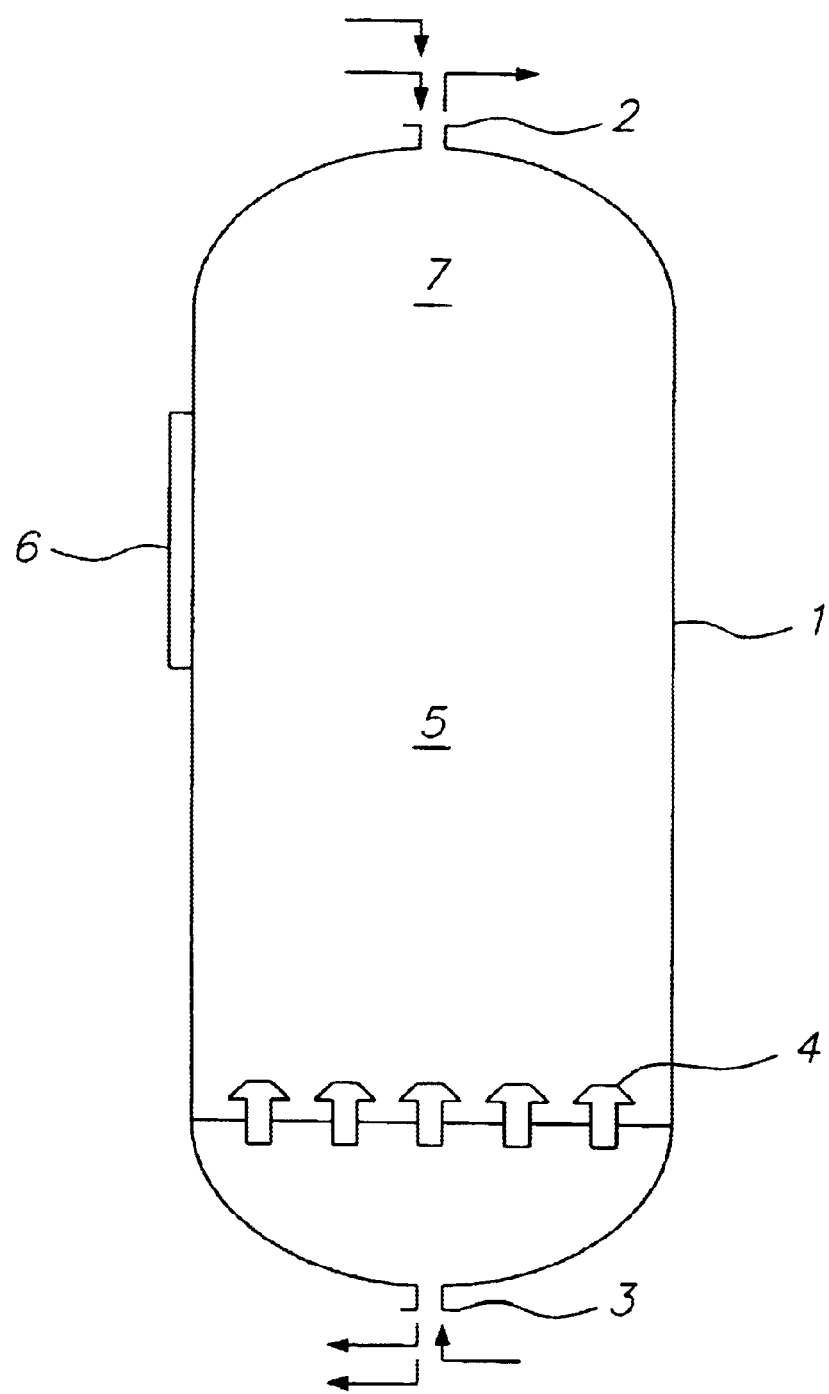
FIG. 1 is a schematic representation of a currently available cocurrent system (the prior art)

FIG. 1 is a simplified schematic representation of a currently cocurrent system the prior art). Column 1 with nozzle equipped underdrain bed 4 is filled with ion exchange resin about 50% to 60% of the total volume. Above the resin bed is freeboard 7. During service the liquid flows from port 2, which comes into contact with the compacted resin bed 5 and flows out to the outlet through port 3. During regeneration the direction of flow of the regenerant is identical to the service operation. Before the regeneration the resin is to be backwashed with the direction of flow from port 3 as the inlet to the outlet through port 2. This upflow direction will fluidize the resin bed 5, and resin fines and contaminated particles will be removed during this process. The resin level and backwash effectiveness can be monitored through sight glass 6.

Figure 2B:
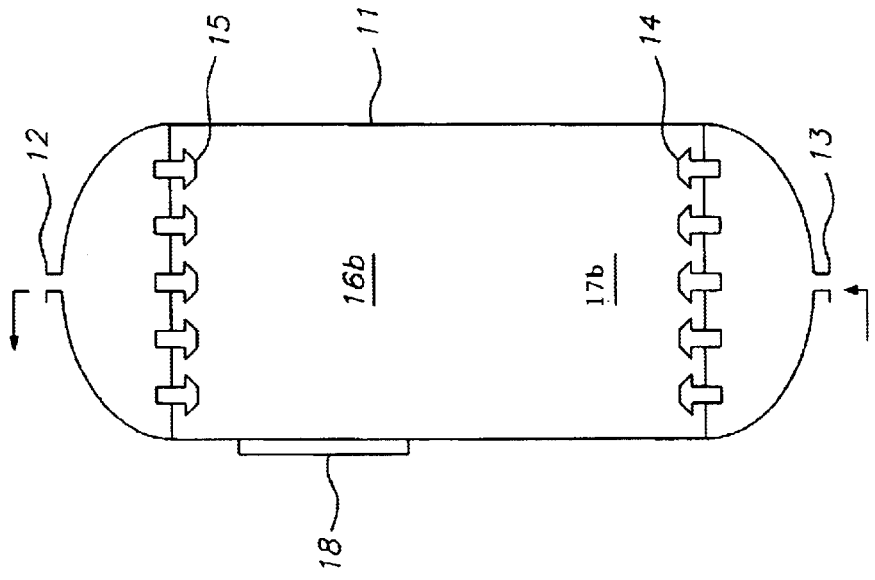
FIG. 2B is a schematic representation of a currently available counter current system with down flow service and upflow regeneration (the prior art) operating in the regeneration mode.
Figure 2A:
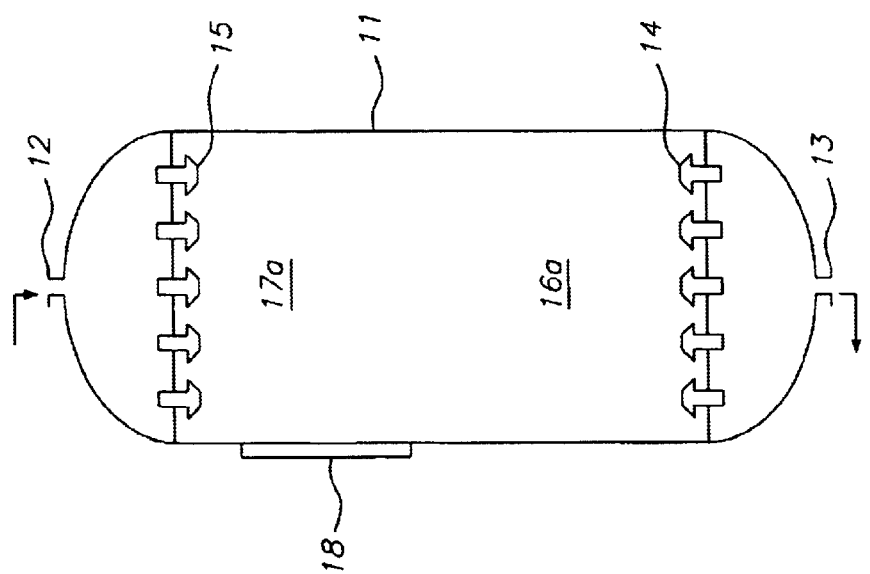
FIG. 2A is a schematic representation of a currently available counter current system with down flow service and upflow regeneration (the prior art) operating in the normal down flow service mode.

FIG. 2a and 2b are schematic representations of a currently available counter current system with down flow service and upflow regeneration (the prior art). Column 11 with nozzle equipped underdrain bed 14 and upper bed 15 is filled with ion exchange resin. During service (FIG. 2a) the fluid is directed through port 12 passing the compacted resin bed 16a with outlet at port 13. During regeneration (FIG. 2b) the regenerant passes through port 13 and the resin bed 16b with outflow through port 12. The resin will not be compacted and this will affect the regeneration efficiency. The level of the resin can be monitored from sight glass 18. Free board 17a and 17b are about 20 cm to 30 cm height just to allow the resin to expand during service operation. This system does not have an internal backwashing system. Therefore when the resin has to be backwashed it should be removed from the column to an external resin cleaning system.

Figure 3B:
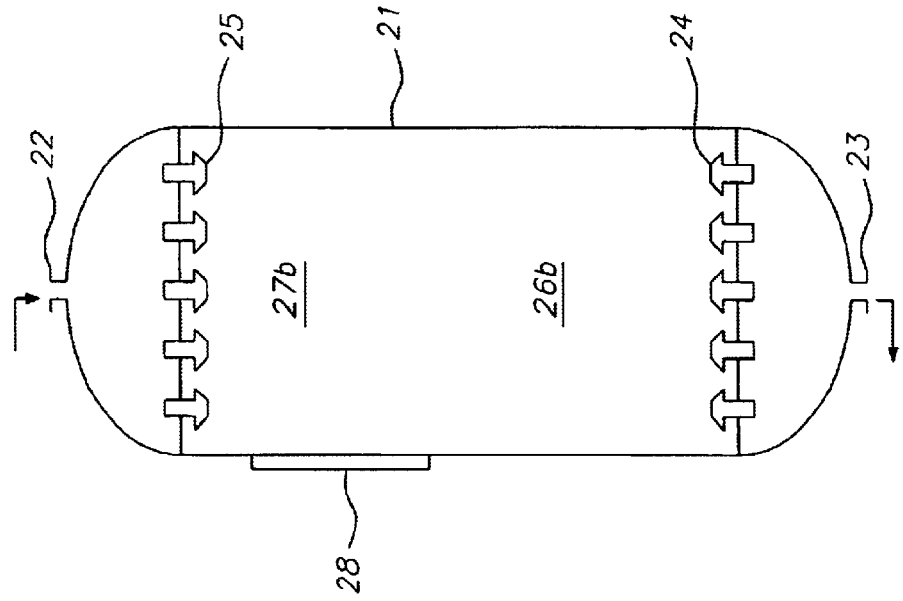
FIG. 3B is a schematic representation of a currently available counter current system with upflow service and down flow regeneration (the prior art) operating in the regeneration mode.
Figure 3A:
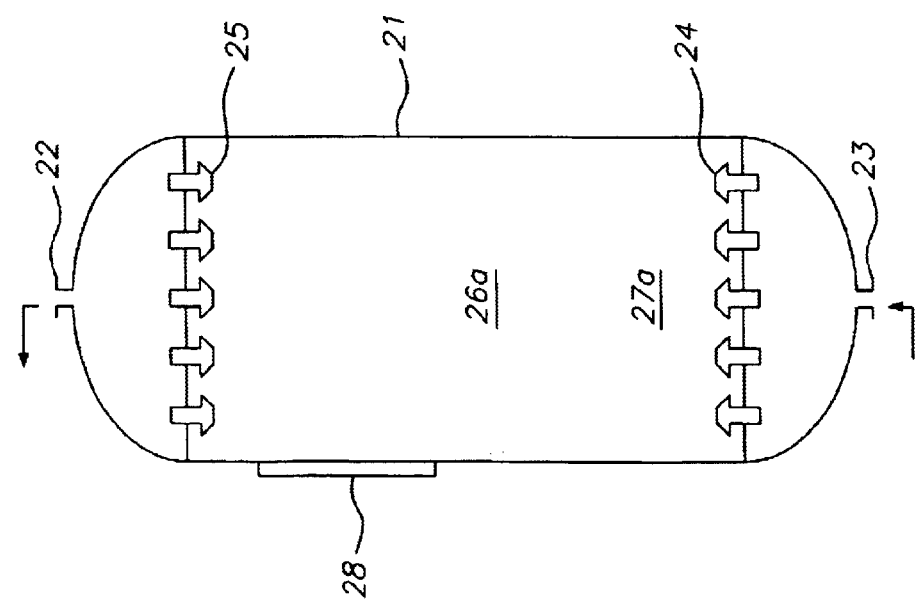
FIG. 3A is a schematic representation of a currently available counter current system with upflow service and down flow regeneration (the prior art) operating in the normal upflow service mode.
Figure 4B:
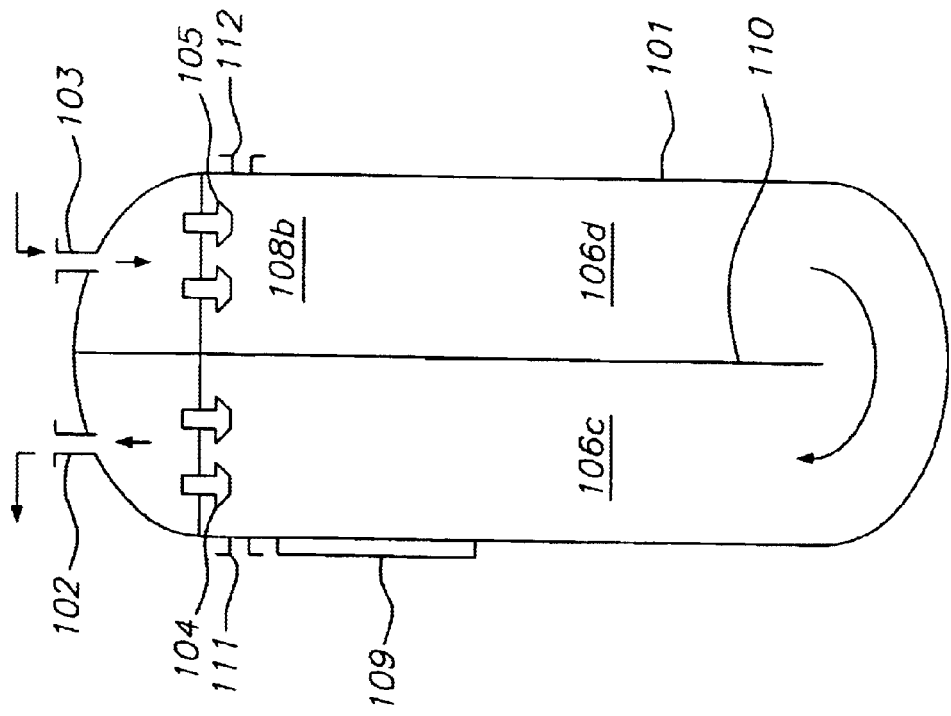
FIG. 4B is a schematic representation of separation system according to the present invention operating in the regeneration mode.
Figure 4A:
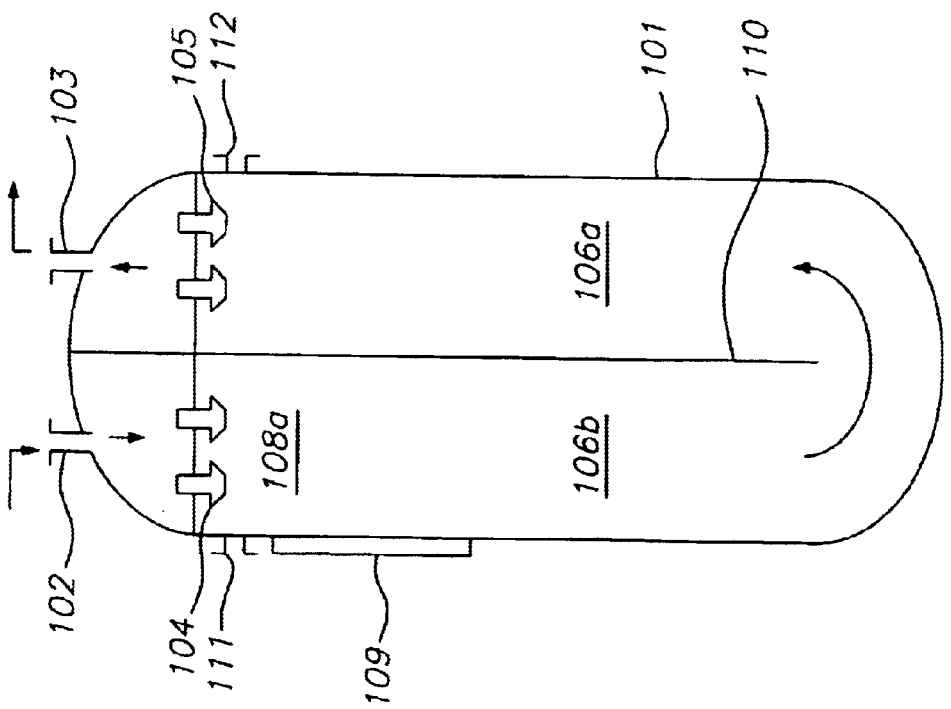
FIG. 4A is a schematic representation of separation system according to the present invention operating in the normal service mode.
Figure 4D:
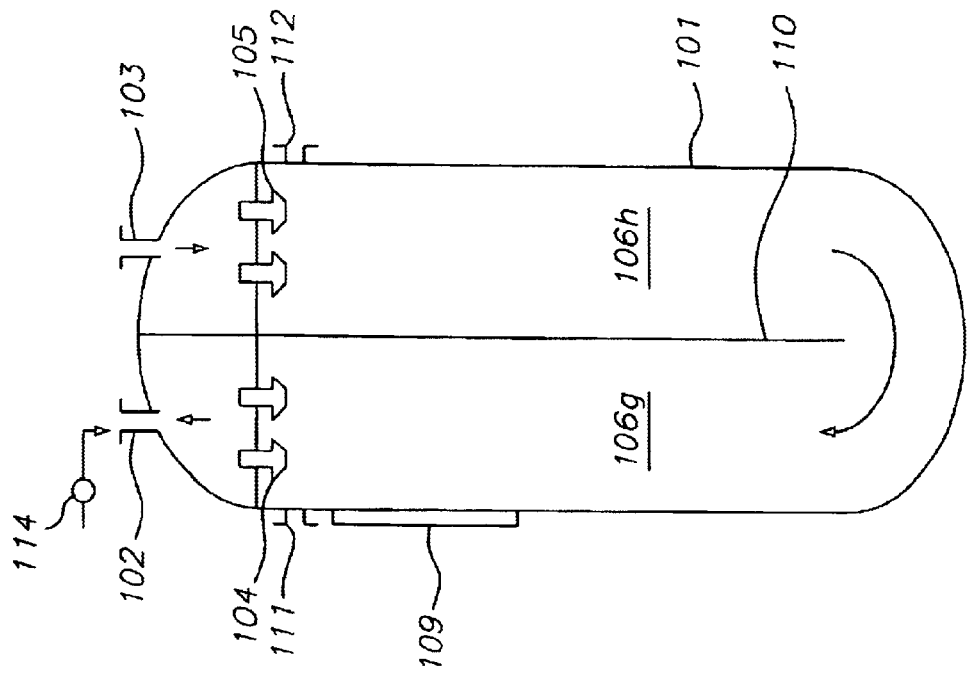
FIG. 4D is a schematic representation of separation system according to the present invention operating in the backwash mode, backwashing the right column.
Figure 4C:
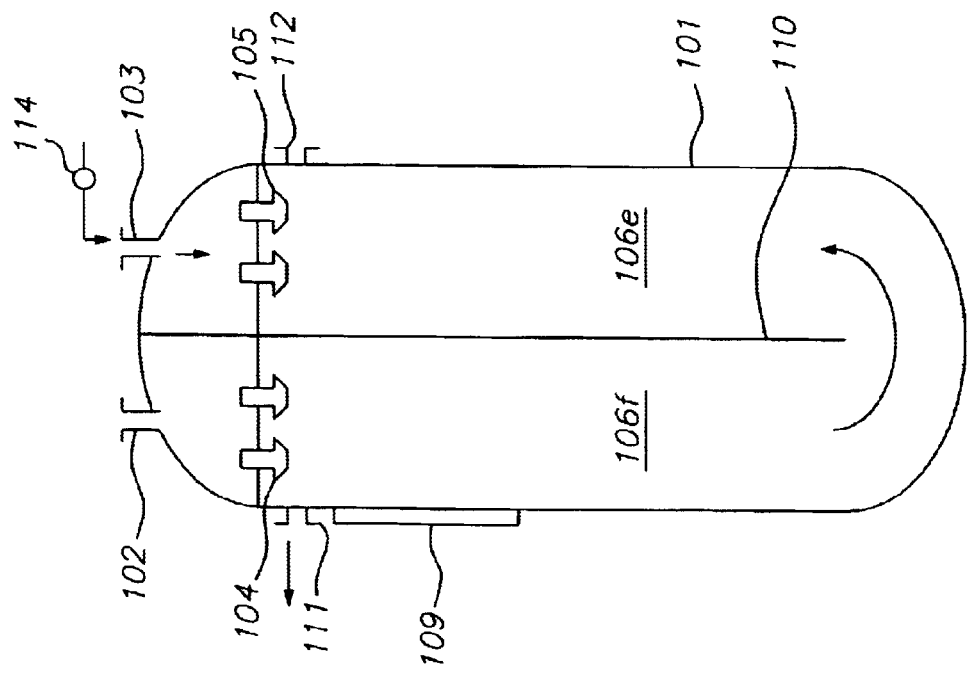
FIG. 4C is a schematic representation of separation system according to the present invention operating in the backwash mode, backwashing the left column.

FIGS. 3a and 3b are schematic representations of a currently available counter current system with upflow service and down flow regeneration (the prior art). Column 21 with nozzle equipped underdrain bed 24 and upper bed 25 is filled with ion exchange resin. During service (FIG. 3a) the fluid flows through port 23, passes the compacted resin bed 26a and flows out through port 22. The service flow should be controlled at such a speed to maintain the resin bed in a compacted state so that the counter current regeneration profile of the resin will always be obtained. Lower speed or interupting the flow will cause the resin not in a compacted state and destroy the regeneration profile of the resin which will affect the quality of the treated liquid.

During regeneration (FIG. 3b) the regenerant passes through port 22 and the resin bed 26b with outflow through port 23. In this cycle the resin bed is always compacted and the regeneration efficiency is high. The level of the resin can be monitored through sight glass 28. Free board 27a and 27b are of about 20 to 30 cm height to allow the resin to expand during the service operation. This system does not have an internal backwashing system. Therefore when the resin has to be backwashed, it should be removed to an external resin cleaning system.

FIGS. 4a, 4b, 4c and 4d are schematic representation systems according to the present invention. Column 101 is divided into two compartments by partition 110 where the lower part is interconnected such as to form a U tube type connection. Nozzle equipped upper bed 104 and 105 are located at the upper part of this column.

During service (FIG. 4a) the fluid flows through port 102, passes the compacted resin 106b downflow and upflows through resin 106a with outlet at port 103. A low flow speed is sufficient to compact the resin bed and once the resin is compacted it will remain in a compacted state even if the flow speed is reduced or interupted. Since the resin is always compacted the counter current regeneration profile will always be obtained which yields high quality of product liquid.

During regeneration (FIG. 4b) the regenerant flows through port 103, passes the compacted resin 106d downflow and upflows through resin 106c with outlet at port 102. A low speed of regenerant flow is sufficient to compact the resin so that the regeneration efficiency is very high. The level of the resin can be monitored through sight glass 109. Free board 108a and 108b are of about 20 to 30 cm height just to allow the resin to expand during the service operation.

Since the system is self cleaning, backwashing to remove resin fines or contaminated particles is normally not required. If after many operation cycles the pressure drop increases such that its value becomes double, internal backwashing may be conducted. When backwashing the left column (FIG. 4c), the flow is conveyed through port 103, passes the resin 106e downflow and upflows through resin 106f, then flows to the outlet through port 111. The flow is controlled by means of flow controller 114 so that the resin will be fluidized and the fine particles can be carried away by the outlet flow. When backwashing the right column, the flow goes through port 102, passes the resin 106g downflow and upflows through resin 106h, and flows out through port 112. The flow is controlled through flow controller 114 so that the resin will be fluidized and the fine particles can be carried away by the outlet flow.

Alternatively, additional backwash port may be located at the bottom of the tube for the inlet of the backwash fluid. In this mode the backwashing process can be conducted for either one of the two columns or for both columns simultaneously. Backwashing the left column from the bottom inlet is conducted by closing port 112 so that the backwash fluid flows from the bottom inlet passing through the resin bed 106f and flows to the outlet through port 111. Backwashing the right column from the bottom inlet can be conducted by closing port 111 so that the backwash fluid flows from the bottom inlet passing through the resin bed 106h and flows out through port 112. Backwashing both columns simultaneously is conducted by opening ports 111 and 112 and flowing the backwash fluid through the bottom inlet port passing through the resin bed 106f (or 106g) and 106e (or 106h and outflowing through ports 111 and 112.

For effective backwash cleaning port 111 and port 112 are to be equipped with resin trap or screen of 0.3 mm to 0.4 mm opening so that the fine particles may be drived out through this opening.

Figure 5:
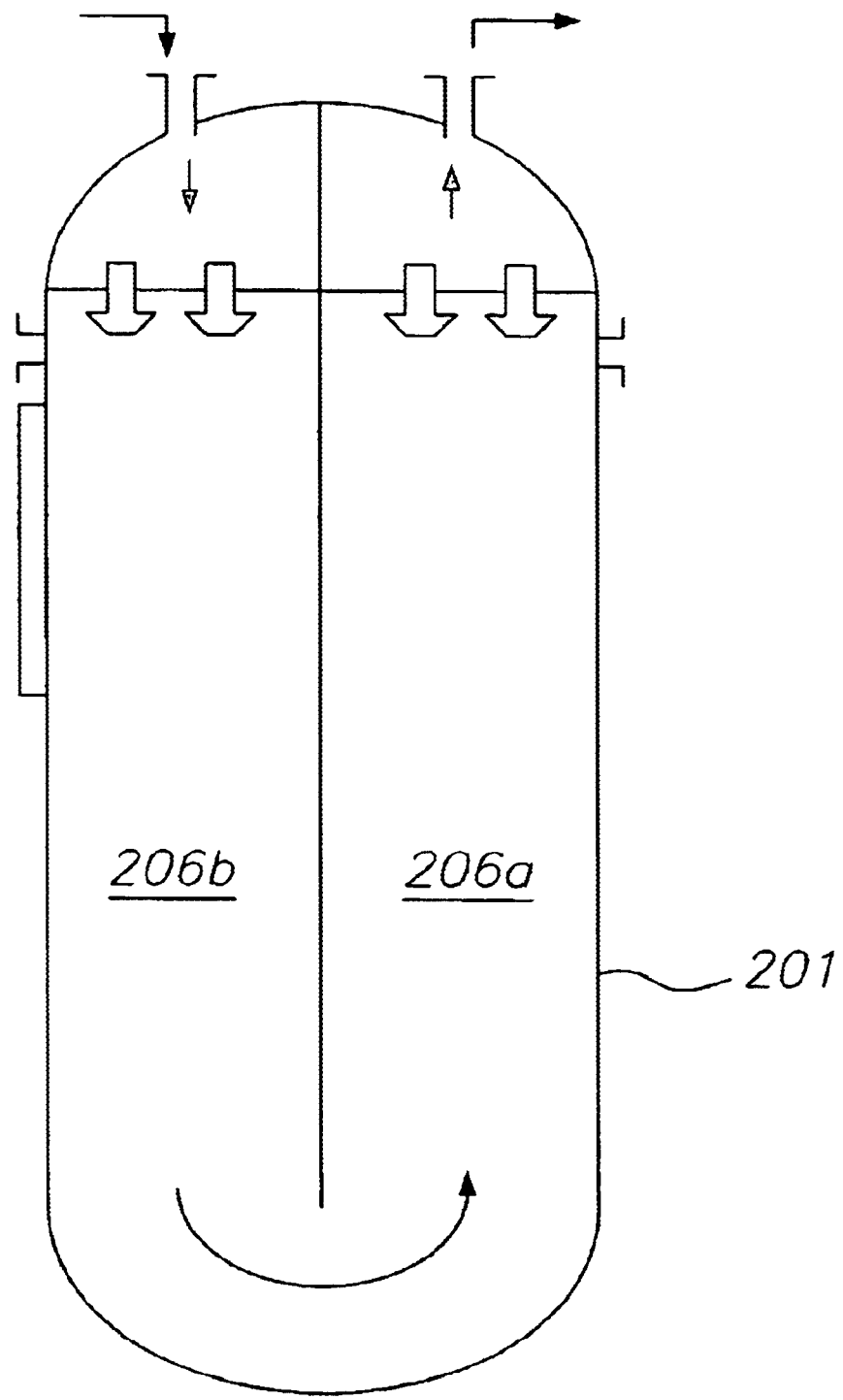
FIG. 5 is a schematic representation of softening process according to the present invention operating in the service.

FIG. 5 is a softening process of water using the system of the present invention. Tank 201 is filled with strong cation resin in sodium form 206a and 206b. Regenerant is sodium chlorine solution.

Figure 6:
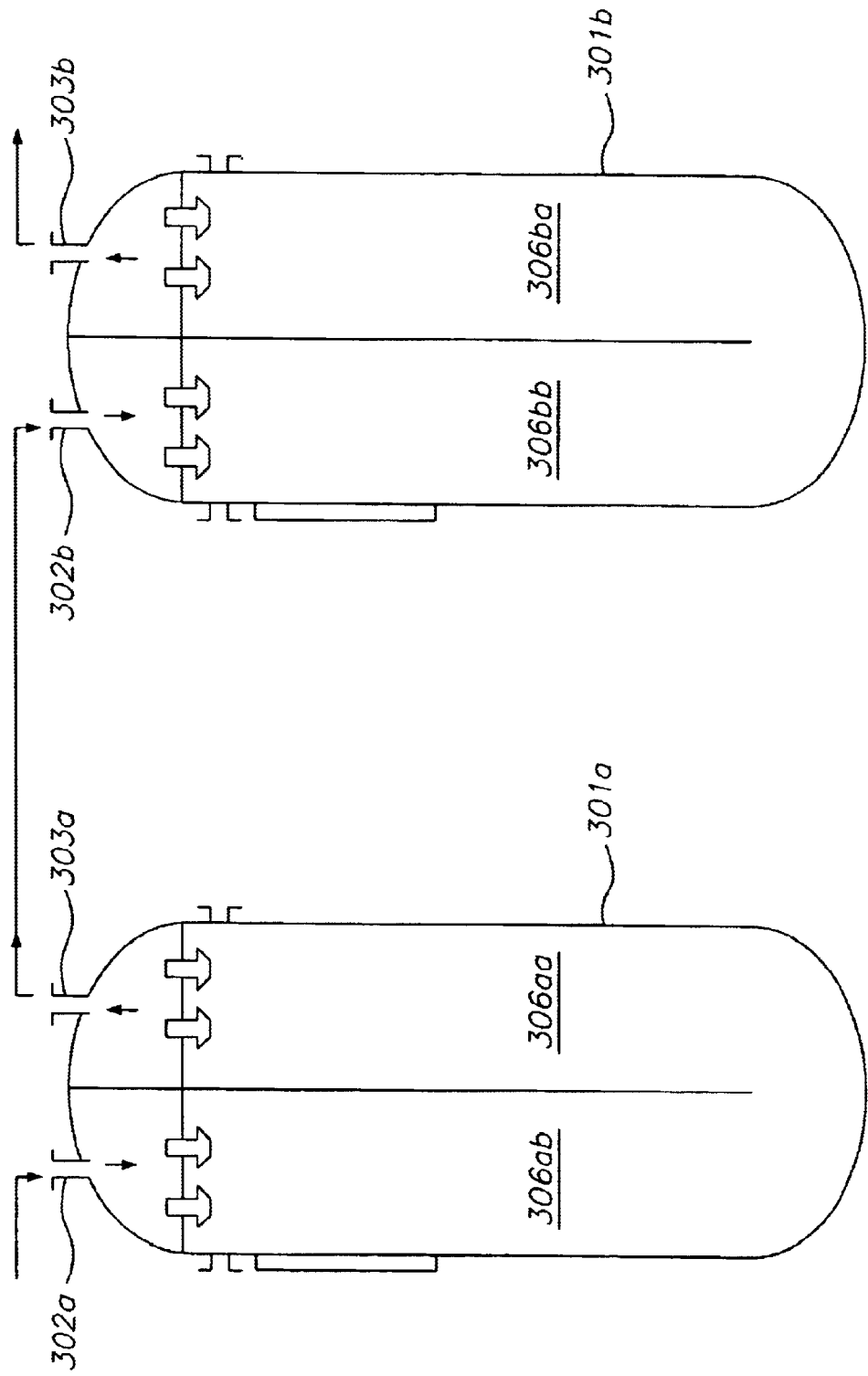
FIG. 6 is a schematic representation of water demineralizing process according to the present invention using strong acid cationic resin for the cation column and strong base anionic resin for the anion column, operating in the service mode.

FIG. 6 is a demineralizing process of water using the system of the present invention. Tank 301a is filled with strong acid cation resin 306ab and 306aa, while tank 301b is filled with strong base anion resin 306ba and 306bb. Regenerants for the strong acid cation resin and the strong base anion resin are hydrochloric acid solution and sodium hydroxide solution respectively.

The service flow is conveyed from port 302a, passes the strong acid cation resin 306ab downflow and upflows through cation resin 306aa, and flows out through port 303a. From this cation exchanger the decationized water flows through port 302b, passes the strong anion resin 306bb downflow, upflows through the resin 306ba and flows out through port 303b. The product is a demineralized water of high purity.

Figure 7:
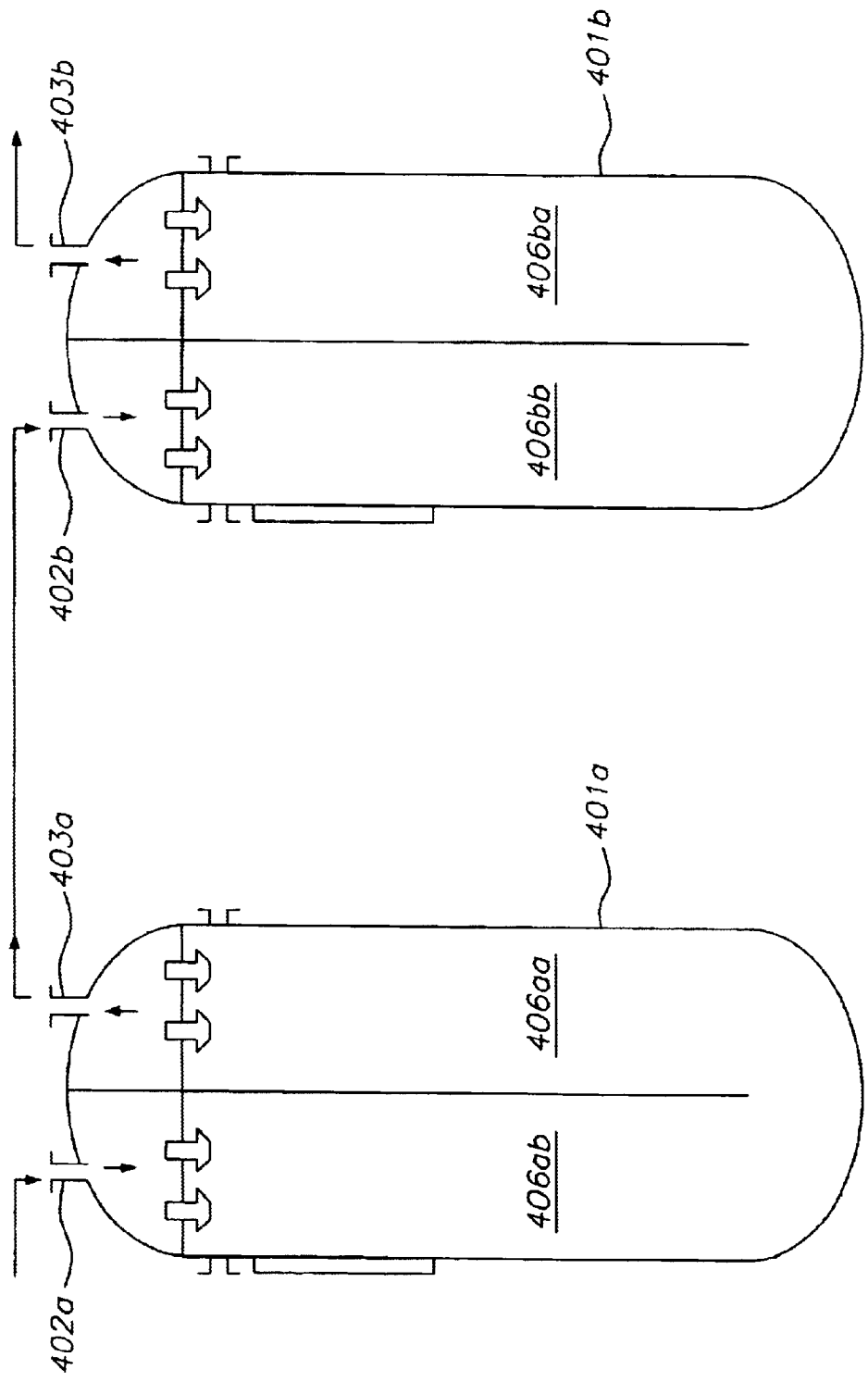
FIG. 7 is a schematic representation of demineralizing and decolourization of sugar solution according to the present invention using strong acid cationic resin for the cation column and strong base macrorectecular anionic resin for the anion column, operating in the service mode.

FIG. 7 is a demineralizing and decolourization process of sugar solution using the system of the present invention. Tank 401a is filled with strong acid cation resin 406ab and 406aa while tank 401b is filled with strong base macrorectecular anion resin which has the capability to adsorb colour of the sugar solution.

Regenerant for the strong acid cation resin is hydrochloric acid solution while for the macrorectecular strong base anion resin the regenerant is sodium hydroxide solution.

The service flow is conveyed from port 402a, passes the strong cation resin 406ab downflow and upflows through resin 406aa, then outflows through port 403a. From this cation exchanger the decationized sugar solution flows through port 402b, passes the strong macrorectecular anion resin 406bb downflow and upflows through resin 406ba, then outflows through port 403b. The product is a demineralized and decolourized sugar solution of high purity.

Figure 8:
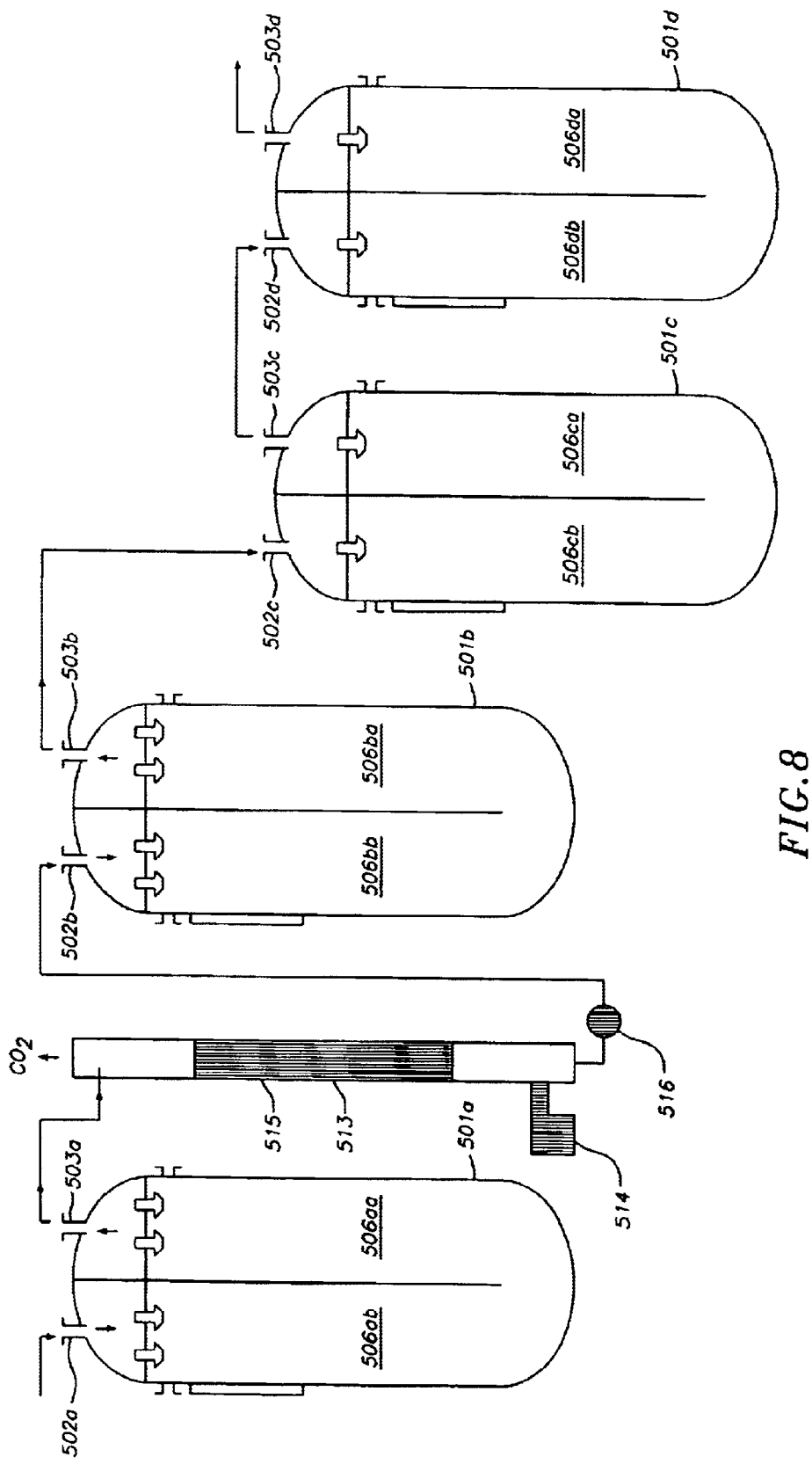
FIG. 8 is a schematic representation of water demineralizing process according to the present invention using combination of weak acid cation resin and strong acid cation resin for the cation column, degasifier, combination of weak base anion resin and strong base anion resin for the anion column with strong acid cation polisher and strong base anion polisher.

FIG. 8 is a demineralizing process of water containing bicarbonate salt using the system of the present invention with degasifier and polisher. Cation exchanger tank 501a is filled with weak acid cation resin 506ab on the left compartment and strong acid cation resin 506aa on the right compartment. The use of these resin combination increases the regeneration efficiency. During regeneration with hydrochloric acid solution the regenerant flow is from port 503*a* downflow passing the strong cation resin 506*aa*. After compacting the resin the regenerant waste which still contains hydrochloric acid at lower concentration passes through and regenerates weak acid cation resin 506*ab* upflow and outlets through port 502*a*.

Degasifier 513 contains deaerator fills 515 and equipped with air blower 514 which blows the air from the lower part of the fills upward.

Decationized water from the cation exchanger containing bicarbonate acid passes through the upper part of the fills and the carbon dioxide gas will be removed along with the blown air.

Anion exchanger tank 501*b* is filled with weak base anion resin 506*bb* in the left compartment and strong base anion resin 506*ba* in the right compartment. The use of this resin combination increases the regeneration efficiency.

During regeneration with sodium hydroxide solution the regenerant flow is from 503*b* downflow passing the strong anion resin 506*ba*. After compacting this resin the regenerant waste which still contain sodium hydroxide at lower concentration passes and regenerates the weak base anion resin 506*bb* upflow and outlets through port 502*b*.

Cation exchanger tank 501*c* is filled with strong cation exchanger 506*cb* and 506*ca* while anion exchanger tank 501*d* is filled with strong anion exchanger 506*db* and 506*da*. These two ion exchangers function as polisher and has the same design as the system in FIG. 6. The service flow of the feed water which contains bicarbonate is conducted from port 502*a*, passes the weak acid cation resin 506*ab* downflow and upflows through the strong acid cation resin 506*aa* with outlet port at 503*a*. The decationized water which contains bicarbonate acid passes degasifier 513 and gets in contact with degasifier fills 515. The $CO_2$ gas from the bicarbonate acid is carried away by the blown air from blower 514. The degasified decationized water is pumped by pump 516 to the anion exchanger through port 502*b*, passes the weak base resin 506*bb* downflow and upflows through the strong base anion resin 506*ba*, and flows out through port 503*b*. The demineralized water is then polished in the cation polisher, passes port 502*c* and flows through strong cation resin 506*cb* downflow and upflows through resin 506*ca* with outlet at port 503*c*. From this cation polisher the water is then conveyed to the anion polisher through port 502*d*, passes the strong base anion resin 506*db* downflow and upflows through resin 506*da*, and goes outlet through port 503*d*. The treated water passing port 503*b* will have a high quality deionized water with conductivity up to less than 1 $\mu$S/cm and residual silica up to less than 20 PPB and after passing through the cation and anion polisher with outlet at port 503*d* the conductivity can be less than 0.1 $\mu$S/cm and residual silica less than 5 PPB.

Figure 9A:
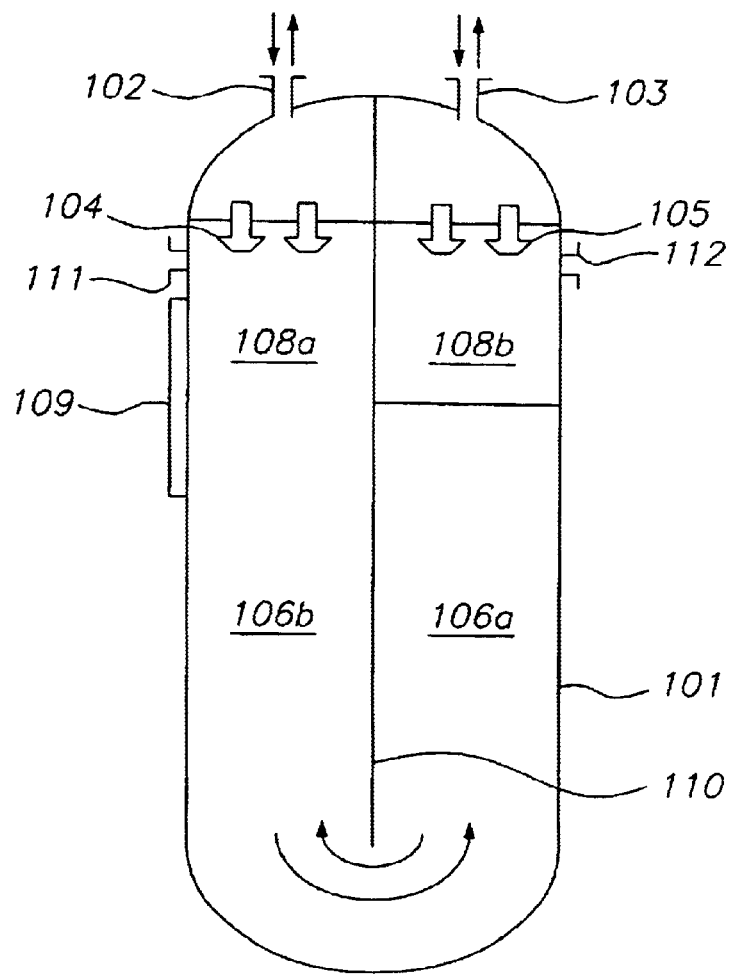
FIG. 9A is a schematic side sectional view of one of the apparatus according to the present invention.
Figure 9B:
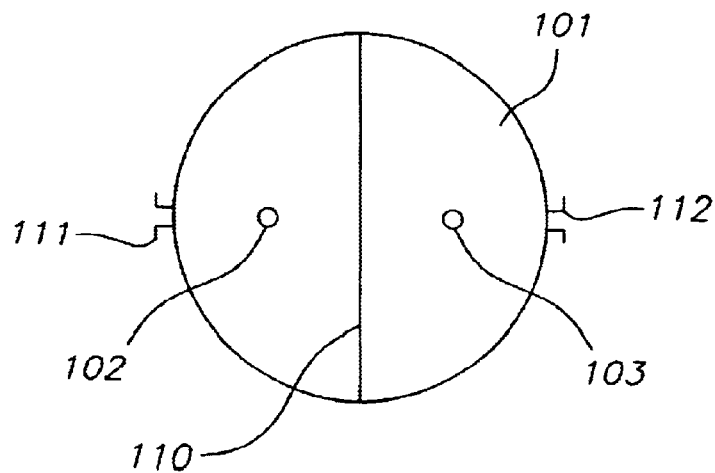
FIG. 9B is a schematic top sectional view of one of the apparatus according to the present invention.
Figure 10:
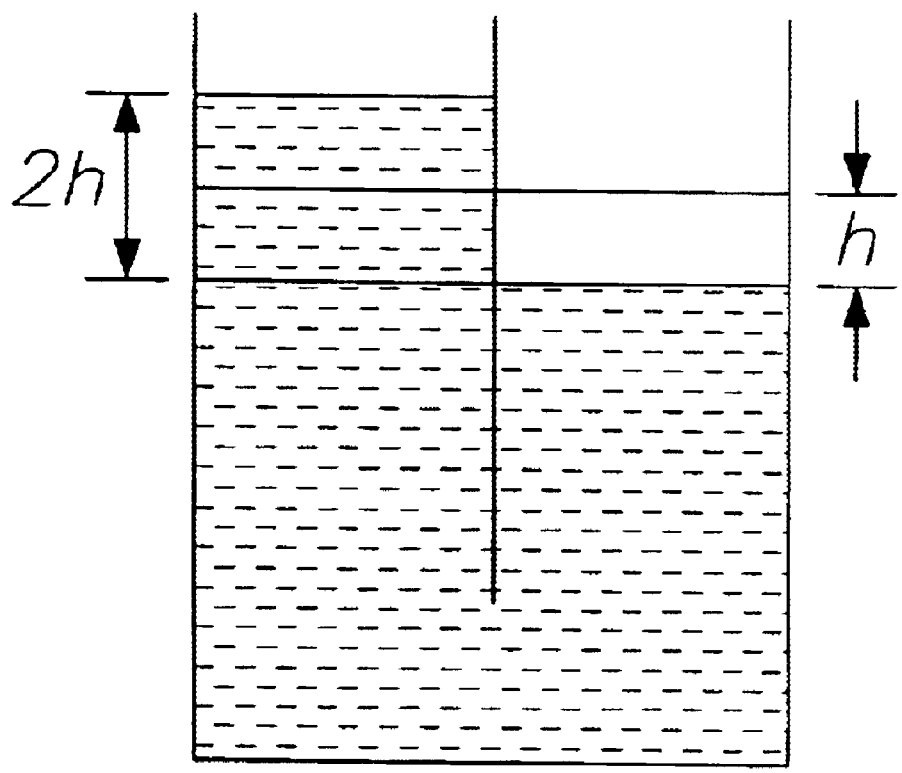
FIG. 10 is a schematic representation of a U tube model of the present invention.
Figure 11:
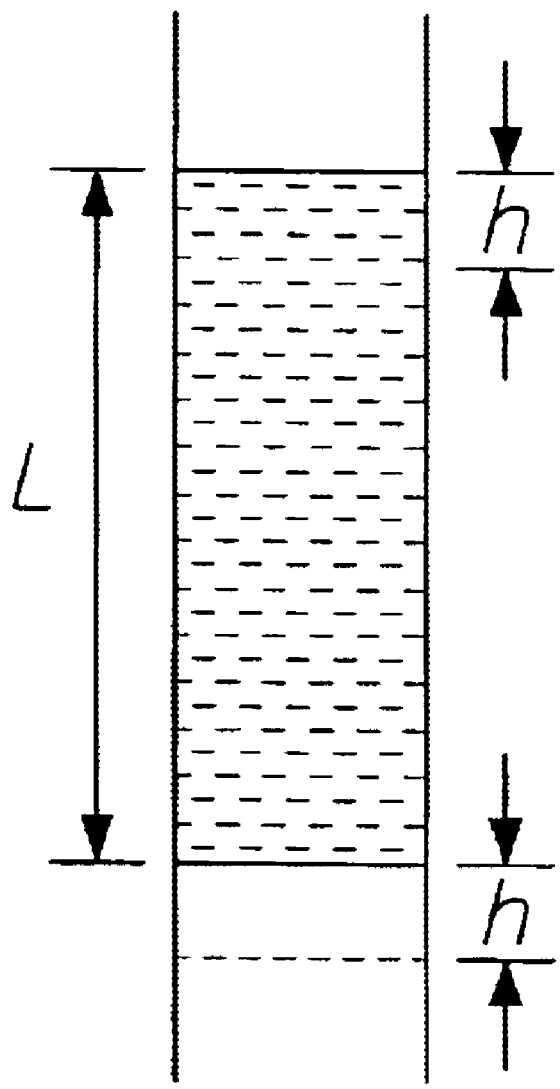
FIG. 11 is a schematic representation of a resin column.

FIGS. 9*a* to 9*b* illustrate the schematic sectional view of the apparatus using the present invention in three configurations. FIGS. 9*a* and 9*b* illustrate a configuration where the vertical column 101 is divided into two compartments by partition 110 with free space at the bottom part so that it forms a U tube type connection. At the upper part of the column is an upper bed with nozzles 104 and 105. Between the upper bed and the surface of the resin bed 106*b* is a free board 108*a* to accommodate the expansion of the resin bed after the resin has been exhausted, and also to accommodate resin expansion during backwash. The level of the resin bed can be observed through sight glass 109. Port 102 is an inlet of the service fluid and outlet for the regenerant fluid while port 103 is an outlet of the service fluid and inlet of the regenerant fluid. The operation can be reversed. Ports 111 and 112 are the outlets for the backwash fluid.

EXAMPLE (COMPARATIVE DATA)

The chemical requirements, conductivity and silica leakage of a system according to the present invention are compared with those of a cocurrent system which are presently widely used. Each system is calculated with the same resin type, flow rate, water analysis and approximately the same resin quantity. Both systems are operating without degasifier.

| Flow rate: | 16.5 $m^3$/h, net run 400 $m^3$ |
| --- | --- |
| Water analysis (in m. eq): | $HCO_3^-$ 0.334, $CO_2$ 0.334, $SO_4^-$ 0.850, $Cl^-$ 0.500, $NO_3$ 0.039, $SiO_2$ 0.194, $Mg^{++}$ 0.168, $Ca^{++}$ 0.997, Na 0.552. |

| | System of the present invention | Co-current System |
| --- | --- | --- |
| Resin type | 6000 \| Amberjet 1200<br>4200 \| Amberlite 96 RF<br>4500 \| Amberjet 4200 | 6000 \| Amberjet 1200<br>4500 \| Amberlite 96 RF<br>4500 Amberjet 4200 |
| Regenerant consumption | 33 kg HCl (As 100%)<br>36 kg NaOH (100%) | 53 kg HCl (As 100%)<br>36 kg NaOH (100%) |
| Tank diameter | 1000 mm | 1000 mm |
| Effective tank height | 1700 mm | 3100 mm |
| Conductivity Average/end point | 1.0/3.0 $\mu$S/cm | 3.0/6.0 $\mu$S/cm |
| Silica leakage Average/end point | 0.03/0.10 mg/l | 0.12/0.20 |

From the data mentioned above it can be observed that the system of the present invention has more advantages when compared to the presently used cocurrent system. The cocurrent system consume 60% more HCl regenerant, 80% more tank height, 300% more average conductivity level and 400% more average silica leakage as compared to the system based on the present invention. The operation and construction cost of the system based on the present invention is much lower than the presently used cocurrent system while the treated water quality produced by the system of the present invention is much better than that of the cocurrent system.

What is claimed is:

1. An apparatus for conducting liquid separation utilizing an ion exchange process, the apparatus comprising:

a liquid separation column, the column comprising a partition within the column dividing the column, into first and second vertical compartments, the vertical compartments being joined at their lower ends to form a U-tube portion between the compartments, wherein the first and second compartments are in fluid communication;

each vertical compartment including an upper fluid inlet port located in the top of the compartment, the inlet ports being in fluid communication with the interior of the compartments and an external fluid source;

each vertical compartment being equipped with an upper bed disposed inside each compartment, the beds being proximate to the upper end of the compartments and below the inlet ports;

the upper beds having fluid distribution nozzles, wherein fluid received from the inlet ports is directed into the compartments at a controlled flow rate;

each compartment further including an outlet port for backwashng, each outlet port being disposed adjacent to and below each upper bed, wherein the outlet ports remove particulate matter larger than the upper bed nozzle openings; and an ion exchange resin layer disposed within each vertical compartment, wherein a free board is defined between a top level of the ion exchange resin layer and the upper bed in each compartment, whereby the free board allows the resin layer to expand and contract during the liquid separation process.

2. The liquid separation apparatus of claim 1, wherein the vertical compartments further include a sight glass for monitoring the level of the resin layer.

3. A liquid separation process performed by the apparatus of claim 1, wherein the inlet and outlet ports are in fluid communication with a service fluid supply, a regenerant fluid supply, a backwash fluid supply, and a pump for pumping the service fluid, regenerant fluid, and backwash fluid through the apparatus; the process comprising the steps of:

pumping service fluid through the inlet port of the first compartment down through the ion exchange resin layer of the first compartment and up through the ion exchange layer of the second compartment, the filtered fluid exiting the apparatus through the inlet port of the second compartment;

regenerating the ion exchange resin layers by pumping regenerating fluid through the inlet port of the second compartment down through the ion exchange resin layer of the second compartment and up through the ion exchange layer of the first compartment, wherein the regenerant fluid exits the apparatus through the inlet port of the first compartment; and backwashing the apparatus when the pressure drop of the service fluid increases to a predetermined level.

4. The liquid separation process of claim 3, wherein the step of backwashing when the pressure drop of the service fluid reaches a predetermined level, comprises:

backwashing the resin in the first compartment by pumping the backwash fluid at a controlled flowrate through the inlet port of the second compartment and outflowing the fluid through the outlet port of the first compartment; and backwashing the resin in the second compartment by pumping the backwash fluid at a controlled flowrate through the inlet port of the first compartment and outflowing the fluid through the outlet port of the second compartment.

5. The liquid separation process of claim 3, wherein the step of backwashing when the pressure drop of the service fluid reaches a predetermined level, comprises:

opening simultaneously the outlet ports in both the first and second compartments; and pumping the backwash fluid through the inlet port and outflowing the backwash fluid through the outlet port of each compartment.

6. The liquid separation apparatus of claim 1 wherein the partition does not extend to a lower end of the column for defining the U-tube portion between the compartments and allowing for the fluid communication between the compartments.

* * * * *